US005472789A

United States Patent [19]

Iqbal et al.

[11] Patent Number: 5,472,789

[45] Date of Patent: Dec. 5, 1995

[54] TRANSPARENT LIQUID ABSORBENT MATERIALS FOR USE AS INK RECEPTIVE LAYERS

[75] Inventors: Mohammad Iqbal; Alan G. Miller, both of Austin, Tex.; John J. Stofko, Jr., St. Paul, Minn.

[73] Assignee: Minnesota Mining and Manufacturing Company, St. Paul, Minn.

[21] Appl. No.: 343,241

[22] Filed: Nov. 22, 1994

Related U.S. Application Data

[62] Division of Ser. No. 602,626, Oct. 24, 1990, Pat. No. 5,389,723.

[51] Int. Cl.$^6$ .......................... B32B 23/08; B32B 27/08; B32B 27/18; B32B 33/00

[52] U.S. Cl. .......................... 428/483; 428/195; 428/203; 428/500; 428/508; 428/510; 428/520

[58] Field of Search .................................... 428/483, 500, 428/508, 510, 520

[56] References Cited

U.S. PATENT DOCUMENTS 5,389,723 2/1995 Iqbal et al. ................................ 525/57

*Primary Examiner*—James C. Cannon

*Attorney, Agent, or Firm*—Gary L. Griswold; Walter N. Kirn; Darla P. Neaveill

[57] ABSTRACT

Semi-interpenetrating polymeric networks comprising a blend of hydrophilic and hydrophobic polymers wherein at least one of the polymeric components is crosslinked after blending to form a continuous network throughout the bulk of the material, and through which the uncrosslinked polymeric components are intertwined in such a way as to form a macroscopically homogeneous composition. The integrity of such networks persists even after absorption of solvent. These materials can be used to form durable, non-tacky, ink-absorbent, transparent coatings for graphical materials.

18 Claims, No Drawings

TRANSPARENT LIQUID ABSORBENT MATERIALS FOR USE AS INK RECEPTIVE LAYERS

This is a division of application Ser. No. 07/602,626 filed Oct. 24, 1990, now U.S. Pat. No. 5,389,723.

BACKGROUND OF THE INVENTION

1. Field of the Invention

This invention relates to transparent materials that are capable of absorbing liquids, and, more particularly, to materials that can be used as ink-receptive layers for transparent imageable materials.

2. Discussion of the Art

Transparent materials that are capable of absorbing significant quantities of liquid, while maintaining some degree of durability and transparency, are useful in contact lenses, priming layers for coatings coated out of aqueous solutions, fog-resistant coatings, and transparent imageable materials for use with mechanized ink depositing devices, such as pen plotters and ink-jet printers. Transparent imageable materials are used as overlays in technical drawings and as transparencies for overhead projection. It is desirable that the surface of liquid absorbent materials for use in transparent graphical applications be tack free to the touch even after absorption of significant quantities of ink.

During normal use of pen plotters and ink-jet printers, the inks used in such machines are exposed to open air for long periods of time prior to imaging. After such exposure to air, the ink must still function in an acceptable manner, without loss of solvent. To meet this requirement, ink formulations typically utilize solvents of very low volatility, such as water, ethylene glycol, propylene glycol, and so on. Inks that contain water or water-miscible solvents are commonly referred to as aqueous inks, and the solvents for these inks commonly are referred to as aqueous liquids. Materials that are receptive to such aqueous liquids will hereinafter be referred to as hydrophilic compositions.

Because of the low volatility of aqueous liquids, drying of an image by means of evaporation is very limited. In the case of imaging onto a paper sheet which has a fibrous nature, a significant amount of the liquid diffuses into the sheet, and the surface appears dry to the touch within a very short time. In the case of imaging onto polymeric film, some means of absorbing aqueous liquids is needed if satisfactory drying of image is to occur.

Compositions useful as transparent liquid absorbent materials have been formed by blending a liquid-insoluble polymeric material with a liquid-soluble polymeric material. The liquid-insoluble material is presumed to form a matrix, within which the liquid soluble material resides. Examples of such blends are the transparent water-absorbent polymeric materials disclosed in U.S. Pat. Nos. 4,300,820, 4,369,229, and in European Patent Application No. 0 233 703.

A problem that frequently arises in the formulation of polymer blends is the incompatibility of the polymers being blended. When attempts are made to blend polymers that are incompatible, phase separation occurs, resulting in haze, lack of transparency, and other forms of inhomogeneity.

Compatibility between two or more polymers in a blend can often be improved by incorporating into the liquid-insoluble matrix-forming polymer chains monomeric units that exhibit some affinity for the liquid-soluble polymer.

Polymeric materials having even a small amount of acid functionality are more likely to exhibit compatibility with polyvinyl lactams. Generally, the compatibility of polymers being blended is improved if the polymers are capable of hydrogen bonding to one another.

A second form of incompatibility noted in using blends of liquid-absorbent polymers is the incompatibility of the matrix forming insoluble polymer with the liquid being absorbed. For example, if the liquid being absorbed is water, and if the water-insoluble polymers are hydrophobic, some inhibition of water absorption ability can be expected. One method of overcoming this difficulty is to utilize hydrophilic matrix polymers that are water-insoluble at the temperatures at which they are to be used, though they may be water-soluble at a different temperature. In U.S. Pat. No. 4,503,111, ink-receptive coatings comprising either polyvinyl alcohol or gelatin blended with polyvinyl pyrrolidone are disclosed. Both polyvinyl alcohol and gelatin, being water-insoluble at room temperature, are able to act as matrix-forming polymers for these coatings, and the coatings are quite receptive to aqueous inks. However, the coatings do exhibit a tendency to become tacky, either because of imaging, or because of high humidity.

It therefore becomes clear that while blends of soluble and insoluble polymers may be useful as liquid absorbent compositions, they suffer major limitations in liquid absorption ability and in durability.

SUMMARY OF THE INVENTION

This invention provides a composition comprising a blend of (a) at least one polymeric matrix component comprising crosslinkable polymers comprising $\alpha,\beta$-ethylenically unsaturated monomers, (b) at least one liquid-absorbent component comprising a water-absorbent polymer, preferably a water-soluble polymer, and (c) polyfunctional aziridines as a crosslinking agent. This composition is capable of forming liquid-absorbent, semi-interpenetrating networks, hereinafter referred to as SIPNs. The SIPNs disclosed herein are polymeric blends wherein at least one of the polymeric components is crosslinked after blending to form a continuous network throughout the bulk of the material, and through which the uncrosslinked polymeric component or components are intertwined in such a way as to form a macroscopically homogeneous composition.

SIPNs of this invention are capable of absorbing significant quantities of those liquids that are solvents of the uncrosslinked portion of the SIPN without loss of physical integrity and without leaching or other forms of phase separation. In cases where the SIPNs are initially transparent, they also remain transparent after absorption of significant quantities of liquids.

The nature of the crosslinking used in the formation of the matrix component of the SIPN is such that it combines durability in the presence of the liquids encountered during use with compatibility toward the liquid-absorbent component. The crosslinked matrix component and the liquid-absorbent component are miscible, exhibit little or no phase separation, and generate little or no haze upon coating. The nature of the crosslinking should also be such that it does not interfere with pot-life and curing properties that are associated with commonly available methods of processing. More particularly, crosslinking should be limited to the matrix component of the SIPN, and should not cause phase separation or other inhomogeneity in the SIPN.

This invention provides polymeric matrices which, when coated on a transparent backing, result in transparent coatings capable of providing improved combinations of ink absorption and durability, while at the same time retaining transparency and being amenable to the types of processing commonly used in producing transparent graphical materials.

DETAILED DESCRIPTION

The crosslinkable portion of the SIPN will hereinafter be called the matrix component, and the liquid-absorbent portion will hereinafter be called the absorbent or liquid-absorbent component.

The matrix component of the SIPN of the present invention comprises crosslinkable polymers that are either hydrophobic or hydrophilic in nature, and are derived from the copolymerization of acrylic or other hydrophobic or hydrophilic ethylenically unsaturated monomers with monomers having acidic groups, or by hydrolysis, if pendant ester groups are already present in these ethylenically unsaturated monomers.

Hydrophobic monomers suitable for preparing crosslinkable matrix components generally have the following properties:

(1) They form water-insoluble homopolymers if polymerized with themselves.

(2) Polymers formed from them contain no pendant groups having more than 18 carbon atoms, preferably no more than 4 carbon atoms, and more preferably, 1 to 2 carbon atoms.

(3) They have hydrogen bonding capabilities so that the backbones of polymers formed therefrom or in substituents of the backbones of polymers formed therefrom exhibit enhanced absorption of water or other hydrogen-bonding liquids.

These monomers are preferably selected from:

(1) acrylates and methacrylates having the structure:

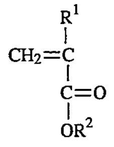

wherein $R^1$ represents hydrogen or —$CH_3$, and $R^2$ represents a member selected from the group consisting of alkyl groups having up to 18 carbon atoms, preferably up to 4 carbon atoms, and more preferably 1 to 2 carbon atoms, cycloaliphatic groups having up to 9 carbon atoms, aryl groups having up to 14 carbon atoms, and oxygen containing heterocyclic groups having up to 10 carbon atoms;

(2) acrylonitrile or methacrylonitile;

(3) styrene or methylstyrene having the structure:

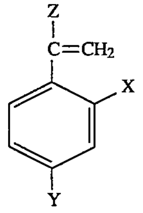

where X and Y independently represent hydrogen, alkyl groups having up to 4 carbon atoms, preferably 1 or 2 carbon atoms, a halogen atom, alkyl halide groups, or $OR^m$, where $R^m$ represent hydrogen or an alkyl group having up to 4 carbon atoms, preferably 1 or 2 carbon atoms, and Z represents hydrogen or methyl; and (4) vinyl acetate.

Hydrophilic monomers suitable for preparing crosslinkable matrix components typically have the characteristic that they form water-soluble homopolymers when polymerized with themselves. They are preferably selected from:

(1) Vinyl lactams having the repeating structure:

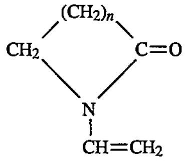

where n represents the integer 2 or 3.

(2) Acrylamide or methacrylamide having the structure:

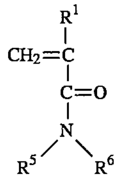

where $R^1$ is as described previously, $R^5$ represents hydrogen or an alkyl group having up to 10 carbon atoms, preferably having from 1 to 4 carbon atoms, and $R^6$ represents a member selected from the group consisting of hydrogen, alkyl groups having up to 10 carbon atoms, preferably having from 1 to 4 carbon atoms, and hydroxy-substituted alkyl groups or alkoxy-substituted alkyl groups having the structure of —$(CH_2)_p$—$OR^7$ where p represents an integer from 1 to 3, inclusive, and $R^7$ represents hydrogen or an alkyl group having up to 10 carbon atoms, preferably having from 1 to 4 carbon atoms.

(3) Tertiary amino alkylacrylates or tertiary amino alkylmethacrylates having the structure:

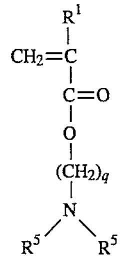

where q represents the integer 1 or 2, and $R^1$ and $R^5$ are as described previously, and each $R^5$ can be the same or different.

(4) Alkoxy alkylacrylates, hydroxy alkylacrylates, alkoxy alkylmethacrylates, or hydroxy alkylmethacrylates having the structure:

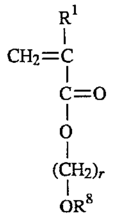

where r represents an integer from 1 to 4, inclusive, preferably 2 or 3, $R^1$ is as described previously, and $R^8$ represents hydrogen or an alkyl group having 1 to 4 carbon atoms.

(5) Alkoxy acrylates or alkoxy methacrylates having the structure:

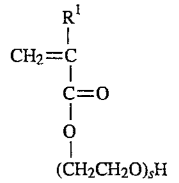

where s represents an integer from 5 to 25, inclusive, and $R^1$ is as described previously.

Some of the structures of both the above-mentioned hydrophobic and hydrophilic monomeric units contain pendant ester groups, and these can be rendered crosslinkable by hydrolysis. For the others, monomers containing acidic-groups can be copolymerized with non-functionalized monomers by free-radical solution, emulsion, or suspension polymerization techniques to produce crosslinkable polymers. Suitable monomers containing acidic-groups include acrylic acid or methacrylic acid, other copolymerizable carboxyclic acids, and ammonium salts. Monomers containing acidic-groups can also be grafted onto polymers.

When acrylic or methacrylic acid is used, the acidic group is present at a level of from about 1.0% to about 20% by weight of the crosslinkable polymer, and preferably from about 2.5% to 9% by weight. When ammonium salts are used, the amine structure can be as follows:

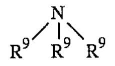

where $R^9$ independently represents hydrogen or an alkyl group having up to 5 carbon atoms, preferably 1 or 2 carbon atoms, with the preferred amine being $NH_3$ or another volatile amine.

While it is the primary function of the matrix component of the SIPN to impart physical integrity and durability to the SIPN without adversely affecting the liquid-absorbency of the SIPN, it is the primary function of the liquid-absorbent component to promote liquid-absorbency. When aqueous liquids are to be absorbed, as is in the case of most inks, the liquid-absorbent component can be water-absorbent, preferably water-soluble, and can be selected from polymers formed from the following monomers:

(1) Vinyl lactams having the repeating structure:

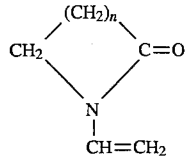

where n is as described previously.

(2) Tertiary amino alkylacrylates or tertiary amino alkylmethacrylates having the structure:

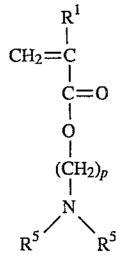

where p, $R^1$ and $R^5$ are as described previously, and each $R^5$ can be the same or different.

(3) Alkyl quaternary amino alkylacrylates or alkyl quaternary amino alkylmethacrylates.

Polymerization of these monomers can be carried out by typical free radical polymerization techniques as described previously.

Alternately, the liquid-absorbent component can also be selected from commercially available water-absorbent polymers such as polyvinyl alcohol, copolymers of vinyl alcohol and vinyl acetate, polyvinyl formal, polyvinyl butyral, gelatin, carboxymethylcellulose, hydroxyethyl cellulose, hydroxypropyl cellulose, hydroxyethyl starch, polyethyl oxazoline, polyethylene oxide, polyethylene glycol, polypropylene oxide. The preferred polymers are polyvinyl lactams, and, in particular, polyvinyl pyrrolidone, polyvinyl alcohol, and polyethylene oxide.

Crosslinking can be performed by means of polyfunctional aziridines, such as trimethylol propane-tris-(β-(N-aziridinyl)propionate)

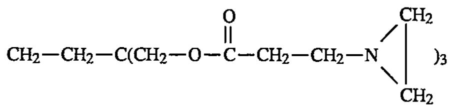

pentaerythritol-tris-(β-(N-aziridinyl)propionate)

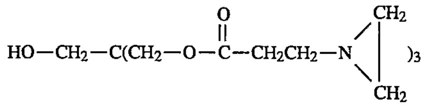

trimethylol propane-tris-[β-(N-methylaziridinyl propionate)

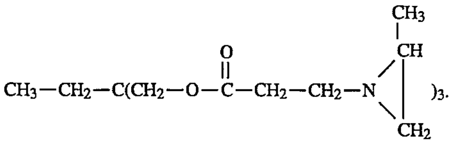

These polyfunctional aziridines must possess at least two crosslinking sites in one molecule.

A preferred use of the SIPNs of this invention is for forming ink receptive layers for graphical materials. Typically, these SIPNs comprise from about 0.5 to 6.0% by weight of crosslinking agent, more preferably from about 1.0 to 4.5% by weight based, on the total weight of the SIPN. The matrix component can be present at a level of from about 23.5 to about 98.5% by weight of the total SIPN, more preferably from about 30 to about 57.5% by weight. The absorbent component can be present at a level of from about 1 to about 70.5% by weight, and more preferably from about 38.0 to about 69% by weight. When polyvinyl pyrrolidone is used as the absorbent component of the SIPN and acrylates are used as the matrix component, good absorption of aqueous inks can be obtained at room temperature if the polyvinyl pyrrolidone comprises at least about 30% by weight, more preferably at least about 50% by weight of the SIPN. Higher absorption can be obtained at the expense of durability if the polyvinyl pyrrolidone is present in greater amounts. When polyvinyl pyrrolidone is present at a level of about 80% by weight of the SIPN, the matrix component is not able to form a complete network, and the entire composition loses its physical integrity when washed with water.

In cases where the SIPNs of the invention are to be used as liquid-receptive layers borne by solid substitutes, as in transparent graphical materials, it is convenient to apply such layers to the substrates in the form of a coatable liquid composition, which is subsequently dried to form a solid layer. A coatable liquid composition can be prepared by dissolving the matrix component and the absorbent component in appropriate proportions in a common solvent, preferably water or a water miscible solvent, depending on the solubility of the polymers. The solvents can be selected on the basis of Hansen solubility parameters. The crosslinking agent is then added to the solution, and the solution is mixed until it becomes uniform. This solution can then be applied to a transparent substrate, e.g., a polymeric film, by coating, and allowed to dry. The amount of heat required to accomplish the drying in a reasonable time is usually sufficient for causing crosslinking of crosslinkable polymer of the the matrix component to occur. The pot life of the solution after the addition of the crosslinking agent is between 18 to 24 hours, but it is preferred that the blend be used within three to four hours.

SIPN solutions of the present invention may contain additional modifying ingredients such as adhesion promoters, particles, surfactants, viscosity modifiers, and like materials, provided that such additives do not adversely affect the liquid-absorbing capability of the invention.

Coating can be carried out by any suitable means, such as by a knife coater, a rotogravure coater, a reverse roll coater, or other conventional means, as would be known to one of ordinary skill in the art. Drying can be accomplished by means of heated air. If preferred, an adhesion promoting priming layer can be interposed between the applied coating and the substrate. Such priming layers can include prime coatings. Alternatively, surface treatments, such as corona treatment, or other appropriate treatment can be used to promote adhesion. Such treatments would be known to one of ordinary skill in the art. Adhesion of the SIPN layer can also be promoted by interposing a gelatin sublayer of the type used in photographic film backings between the priming layer and the SIPN layer. Film backings having both a priming layer and a gelatin sublayer are commercially available, and are frequently designated as primed and subbed film backings.

When the SIPNs of the present invention are to be used to form the ink-absorbing layers of films for use with ink-jet printers, it is preferred that the backing of the film have a caliper in the range of about 50 to about 125 micrometers. Films having calipers below about 50 micrometers tend to be too fragile for graphic arts films, while films having calipers over about 125 micrometers tend to be too stiff for easy feeding through many of the imaging devices currently in use. Backing materials suitable for graphic arts films include polymeric materials, such as, for example, polyesters, e.g., polyethylene terephthalate, cellulose acetates, polycarbonates, polyvinyl chloride, polystyrene, and polysulfones.

When the SIPNs of the present invention are to be used to form ink absorbing layers for films for ink-jet printing, the SIPN layer may further be overcoated with an ink-permeable anti-tack protective layer, such as, for example, a layer comprising polyvinyl alcohol in which starch particles have been dispersed, or a semi-interpenetrating polymer network in which polyvinyl alcohol is the absorbent component. A further function of such overcoat layers is to provide surface properties which help to properly control the spread of ink droplets so as to optimize image quality.

In order to more fully illustrate the various embodiments of the present invention, the following non-limiting examples are provided. All parts are parts by weight unless indicated otherwise.

EXAMPLE 1

The polymeric material for the matrix component of this example was prepared by combining N-vinyl-2-pyrrolidone (75 parts by weight), N,N-dimethyl acrylamide (2 parts by weight), the ammonium salt of acrylic acid (5 parts by weight), azo-bis-isobutyronitrile (0.14 part by weight, "Vazo", available from E. I. du Pont de Nemours and Company), and deionized water (566 parts by weight) in a one-liter brown bottle. After the mixture was purged with dry nitrogen gas for five minutes, polymerization was effected by immersing the bottle in a constant temperature bath maintained at a temperature of 60° C. for between 18 to 24 hours. The resulting polymerized mixture was then diluted with deionized water to give a 10% solution in water (hereinafter Solution A).

Solution A (8 g of a 10% aqueous solution) was mixed with surfactant (0.2 g of a 2% aqueous solution, "Triton X100", Rohm and Haas Co.), polyvinyl alcohol (8 g of a 5% aqueous solution, "Vinol 540", Air Products and Chemicals, Inc.), and polyfunctional aziridine crosslinking agent (0.5 g of a 10% aqueous solution, XAMA-7, Sanncor Ind., Inc.) in a separate vessel.

The resultant solution was coated onto a backing of polyethylene terephthalate film having a caliper of 100 micrometers, which had been primed with polyvinylidene chloride, over which had been coated a gelatin sublayer of the type used in photographic films for improving gelatin adhesion ("Scotchpar" Type PH primed and subbed film, available from Minnesota Mining and Manufacturing Company). Coating was carried out by means of a knife coater at a wet thickness of 200 micrometers. The coating was then dried by exposure to circulating heated air at a temperature of 90° C. for five minutes to form a clear SIPN layer.

Printing was performed with an ink-jet printer and pen using ink containing Direct Blue 99 dye (3% solution in water). After six minutes, the imaged film was immersed in water and no dye was removed from the image. The SIPN layer remained intact.

Comparative Example A

Example 1 was repeated with the exception that the crosslinking agent was omitted. When the imaged film was immersed in water, dye was removed from the imaged area within 15 minutes.

Example 1 and Comparative Example A demonstrate that a blend can absorb ink, but not retain it, while an SIPN can do both.

EXAMPLE 2

The polymeric material for the matrix component of this example was prepared by combining N-vinyl-2-pyrrolidone (72 parts by weight), N,N-dimethyl acrylamide (20 parts by weight), the ammonium salt of acrylic acid (5 parts by weight), the ammonium salt of 2-acrylamido-2-methyl propane sulfonic acid (3 parts by weight), azo-bis-isobutyronitrile (0.14 part by weight, "Vazo"), and deionized water (566 parts by weight) in a one-liter brown bottle. After the mixture was purged with dry nitrogen gas for five minutes, polymerization was effected by immersing the bottle in a constant temperature bath maintained at a temperature of 60° C. for 18 to 24 hours. The resulting polymerized mixture was diluted with deionized water to give 12% solids solution (hereinafter Solution B).

Solution B (4 g) was mixed with surfactant (0.2 g of a 2% aqueous solution, "Triton X100"), polyethylene oxide (molecular weight=4,000,000, 18 g of a 2% aqueous solution), and crosslinking agent (0.46 g of a 10% aqueous solution, XAMA-7) to form a coatable solution.

The resultant solution was coated onto a backing of polyethylene terephthalate film having a caliper of 100 micrometers, which had been primed with polyvinylidene chloride, over which had been coated a gelatin sublayer of the type used in photographic films for improving gelatin adhesion ("Scotchpar" Type PH primed and subbed film, available from Minnesota Mining and Manufacturing Company). The coating was then dried by exposure to circulating heated air at a temperature of 90° C. for five minutes to form a clear SIPN layer.

Printing was performed with an ink-jet printer and pen using ink containing Direct Blue 99 dye (3% solution in water). After six minutes, the imaged film was immersed in water, and no dye was removed from the image. The SIPN layer remained intact.

Comparative Example B

Example 2 was repeated with the exception that the crosslinking agent was omitted. After the coated film was imaged by means of an ink-jet printer using water-based ink, the coating was completely dissolved by the ink.

EXAMPLE 3

The polymeric material for the matrix component of an ink-receptive layer was prepared by combining in a one-liter bottle N-vinyl-2-pyrrolidone (65 parts by weight), 2-hydroxyethyl methacrylate (15 parts by weight), methoxyethyl acrylate (15 parts by weight), the ammonium salt of acrylic acid (5 parts by weight), azo-bis-isobutyronitrile (0.14 part by weight, "Vazo"), deionized water (300 parts by weight), and ethyl alcohol (100 parts by weight). After the mixture was purged with dry nitrogen gas for five minutes, the mixture was polymerized at a temperature of 60° C. for 16 to 20 hours. The resulting polymerized mixture was diluted with 100 parts of a 1:1 mixture of deionized water and ethyl alcohol to give a solution containing 16.37% by weight of solids (98.25% conversion). This polymer was further diluted with water to give a solution containing 10% solids (hereinafter Solution C).

Solution C (10 g of a 10% aqueous solution) was mixed with polyvinyl alcohol (15 g of a 10% aqueous solution), and polyfunctional aziridine (1.1 g of a 10% solution in ethyl alcohol), prior to coating. The solution was coated onto a primed and subbed polyethylene terephthalate film having a thickness of 100 micrometers (such as that described in Example 1), at a coating weight of 1.0 g/sq ft., and dried in an oven at a temperature of 90° C. for five minutes.

The coated film was imaged on both a Hewlett-Packard Pen Plotter and a Hewlett-Packard Desk Jet ink-jet printer. The ink was absorbed quickly, giving a dry, tack-free image having good image quality.

EXAMPLE 4

A mixture containing methyl methacrylate (85 parts by weight), 2-hydroxy ethyl methacrylate (10 parts by weight), acrylic acid (5 parts by weight), azo-bis-isobutyronitrite (0.14 part by weight, "Vazo"), ethyl acetate (150 parts by weight), and ethyl alcohol (50 parts by weight) was combined in a 500 ml brown bottle. After the mixture was purged with dry nitrogen gas for five minutes, it was polymerized at a temperature of 60° C. for 24 to 36 hours. The polymerized material was diluted with 100 g of ethyl acetate to give a solution containing 20.13% by weight solids (hereinafter Solution D).

Solution D (5.72 g) was mixed with polyvinyl pyrrolidone (10.60 g of a 10% solution in ethanol, PVP-K90, GAF Corporation), crosslinking agent (1.5 g of a 10% solution in ethyl acetate, XAMA-7), and ethyl acetate (2.1 g) to form a coatable solution.

The resultant solution was coated onto a backing of polyethylene terephthalate film having a caliper of 100 micrometers, which had been primed with polyvinylidene chloride, over which had been coated a gelatin sublayer of the type used in photographic films for improving gelatin adhesion ("Scotchpar" Type PH primed and subbed film, available from Minnesota Mining and Manufacturing Company). The coating was then dried by exposure to circulating heated air at a temperature of 90° C. for five minutes to form a clear SIPN layer.

Printing was performed with an ink-jet printer and pen using ink containing Direct Blue 99 dye (3% aqueous solution). After six minutes, the imaged film was immersed in water and no dye was removed from the image. The SIPN layer remained intact. The coated film was also imaged by means of an Hewlett-Packard 7550A Graphic Printer Pen Plotter. Drying time for the ink was less than 60 seconds.

Comparative Example C

Example 4 was repeated with the exception that the crosslinking agent was omitted from the formulation. The resulting coated film did not absorb the ink. Furthermore, the ink clogged in the pen of the Hewlett-Packard 7550A Graphic Printer Pen Plotter.

EXAMPLE 5–8

A mixture containing methyl methacrylate (70 parts by weight), 2-hydroxyethyl methacrylate (25 parts by weight), acrylic acid (5 parts by weight), azo-bis-isobutyronitrile (0.11 part by weight, "Vazo"), ethyl acetate (150 parts by weight), and ethyl alcohol (50 parts by weight) was combined in a 500 ml bottle. After the mixture was purged with dry nitrogen gas for five minutes, it was polymerized for 18 to 24 hours at a temperature of 60° C. The polymerized composition was diluted with 50 g of ethyl acetate to give a solution containing 25.04% by weight solids (87.65% conversion) (hereinafter Solution E).

The following formulations were prepared:

TABLE I

| Example no. | Solution E | Amount (g) Water-soluble polymer | Crosslinking agent[e] | Ethyl acetate |
|---|---|---|---|---|
| 5 | 4.17 | 10.42[a] | 1.44 | 4.0 |
| 6 | 4.90 | 12.25[b] | 1.80 | 2.3 |
| 7 | 5.40 | 13.50[c] | 1.80 | 3.5 |
| 8 | 4.21 | 8.80[d] | 1.22 | 2.5 |

[a]5% polyethylene oxide in $CHCl_3$ (Polyox-100,000, Union Carbide)
[b]10% quaternized copolymer of vinyl pyrrolidone and dimethyl amino ethyl methacrylate in ethanol (Gafquate 734, GAF Corp.)
[c]10% polyvinyl pyrrolidone dimethyl amino ethyl methacrylate in ethanol (Copolymer 965, GAF Corp.)
[d]10% poly-4-vinyl pyridine in ethanol
[e]10% crosslinking agent in ethyl acetate (XAMA-7)

The compositions of Example nos. 5, 6, 7, and 8 were coated onto separate backings of polyethylene terephthalate film having a caliper of 100 micrometers that had been primed with polyvinylidene chloride. The coatings were then dried by being exposed to circulating heated air at a temperature of 90° C. for five minutes to form a clean SIPN layer in each case.

Printing was performed with ink-jet printer and pen using ink containing Direct Blue 99 dye (3% solution in water). When the coated films were imaged by a Hewlett-Packard 7550A Graphic Printer Pen Plotter, images of all colors were bright, with no pick, no pen clogging, and no dye diffusion.

EXAMPLE 9

A mixture containing methyl methacrylate (160 parts by weight), 2-hydroxyethyl methacrylate (30 parts by weight), acrylic acid (10 parts by weight), azo-bis-isobutyronitrile (0.28 part by weight, "Vazo"), and ethyl acetate (466.6 parts by weight) was combined in a one-liter bottle. After the mixture was purged with dry nitrogen gas for five minutes, it was polymerized for 24 to 36 hours at a temperature of 60° C. The polymer was diluted with 75 parts by weight of ethanol to give a solution containing 26.62% by weight solids (98.7% conversion). To this solution was sparged anhydrous ammonia gas with mechanical stirring until the pH of the solution reached 7.0 to 7.5. The solution (hereinafter Solution F) was hazy.

The following ingredients in the amounts indicated were thoroughly mixed to obtain a coating solution:

| Ingredient | Amount (g) |
|---|---|
| Solution F (26.62% solids) | 5.0 |
| Polyvinyl pyrrolidone (PVP-K90) | 1.99 |
| Polyvinyl butyral ("Butvar-B76", Monsanto Co.) | 0.175 |
| Ethyl acetate | 14.0 |
| Ethyl alcohol | 11.0 |
| Crosslinking agent (XAMA-7, 10% in ethyl acetate) | 1.2 |

The resultant solution was coated onto a backing of polyethylene terephthalate film having a caliper of 100 micrometers, which had been primed with polyvinylidene chloride, over which had been coated a gelatin sublayer of the type used in photographic films for improving gelatin adhesion ("Scotchpar" Type PH primed and subbed film, available from Minnesota Mining and Manufacturing Company). The coating was then dried by exposure to circulating heated air at a temperature 90° C. for five minutes to form a clear SIPN layer.

Printing was performed with an ink-jet printer and pen using ink containing Direct Blue 99 dye (3% solution in water). After six minutes, the imaged film was immersed in water and no dye was removed from image. The SIPN layer remained intact. When the coated film was imaged by a Hewlett-Packard 7550 Graphic Printer pen plotter, the images of all colors were bright, with no pick, with no pen clogging, and with no dye diffusion.

EXAMPLE 10

A mixture of methyl methacrylate (83 parts by weight), ethoxylated methacrylate monomer having 5 moles of ethylene oxide (10 parts by weight, HEM-5, available from Alcolac Inc.), acrylic acid (5 parts by weight), dodecyl thiol (0.075 part by weight), azo-bis-isobutyronitrile (0.14 part by weight, "Vazo"), and ethyl acetate (200 parts by weight), was combined in a 500 ml bottle. After the mixture was purged with dry nitrogen gas for five minutes, it was purged for 24 hours. The polymer was diluted with 50 g of a mixture of ethyl acetate and ethyl alcohol (1:1 ratio) to give a solution containing 20.79% by weight solids (83.16% conversion)(hereinafter Solution G).

The following ingredients were thoroughly mixed in the amounts indicated to form a coatable solution:

| Ingredient | Amount (g) |
|---|---|
| Solution G (20.79% solids) | 5.5 |
| Polyvinyl pyrrolidone (PVP-K90) | 1.93 |

-continued

| Ingredient | Amount (g) |
|---|---|
| Polyvinyl butyral (Butvar-B76, Monsanto Co.) | 0.196 |
| Ethyl acetate | 12.5 |
| Ethyl alcohol | 10.0 |
| Crosslinking agent (XAMA-7, 10% in ethyl acetate) | 1.35 |

The resultant solution was coated onto a backing of polyethylene terephthalate film having a caliper of 100 micrometers, which had been primed with polyvinylidene chloride, over which had been coated a gelatin sublayer of the type used in photographic films for improving gelatin adhesion ("Scotchpar" Type PH primed and subbed film, available from Minnesota Mining and Manufacturing Company). The coating was then dried by exposure to circulating heated air at a temperature of 90° C. for five minutes to form a clear SIPN layer.

Printing was performed with an Hewlett-Packard Desk Jet ink-jet printer and Hewlett-Packard 7550 Graphic Printer pen plotter using ink containing Direct Blue 99 dye (3% solution in water). After six minutes, the imaged film was immersed in water and no dye was removed from image. The SIPN layer remained intact. The images were satisfactory and tack-free. This film also exhibited a better tendency to lay flat as compared with other coated films under ambient conditions.

EXAMPLE 11 AND COMPARATIVE EXAMPLE D

Example 11 illustrates a composition comprising a blend of two absorbent polymers, where the presence of the second absorbent polymer results in improved compatibility and liquid absorption as compared to the composition of Comparative Example D, where the second polymer is absent. The compositions set forth in Table II were coated onto polyester film at a wet thickness of 200 micrometers and were allowed to dry for five minutes at a temperature of 85° C.

TABLE II

| | Amount (g) | | | | |
|---|---|---|---|---|---|
| Example no. | Cross-linkable polymer (A) | Absorbent polymer 1 (Polyethylene oxide) | Surfactant[a] | Cross-linking agent[b] | Absorbent Polymer 2[c] |
| 11 | 4 | 2 | 0.2 | 0.35 | 8 |
| Comparative D | 4 | 2 | 0.2 | 0.35 | 0 |

[a]"Triton X100" (2% in water)
[b]XAMA-7 (10% in water)
[c]"Natrosol" 250L (5% water, available from Hercules, Inc.)

The composition of Comparative Example D provided a relatively hazy film because of crystallization of the polyethylene oxide on the surface of the film after the film was imaged. The composition of Example 11 provided a very clear transparent coating with no crystallization after the film was imaged.

EXAMPLE 12

The following example illustrates a SIPN employing gelatin as one of the components of the blend. The following composition was coated onto polyester film at a wet thickness of 200 micrometers and was allowed to dry for five minutes at a temperature of 85° C.

| Ingredient | Amount (g) |
|---|---|
| Solution B (as in Example 2) | 4.0 |
| Gelatin (669-10, 10% aqueous solution) | 4.0 |
| Surfactant ("Triton X100", 2% aqueous solution) | 0.2 |
| Water | 3.0 |
| Crosslinking agent (XAMA-7, 10% aqueous solution) | 0.35 |

The composition of Example 12 provided a clear film upon which ink dried very fast when applied by an ink-jet printer.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An ink-receptive transparent sheet comprising a transparent polymeric film bearing on at least one major surface thereof a layer comprising a semi-interpenetrating network comprising a cross-linked polymeric matrix component and an uncross-linked polymeric liquid-absorbent component, said layer having been formed by uniformly blending a solution of:

(a) at least one polymeric matrix component comprising a cross-linkable polymer derived from α, β-ethylenically unsaturated monomers, (b) at least one polymeric liquid-absorbent component, and (c) polyfunctional aziridine as a crosslinking agent, applying the solution to the transparent sheet and drying and effecting cross-linking within the applied layer.

2. The sheet of claim 1, wherein said film is selected from the group consisting of polyester, cellulose acetate, polycarbonate, polyvinyl chloride, polystyrene, and polysulfone.

3. The sheet of claim 2, wherein said polyester is polyethylene terephthalate.

4. The sheet of claim 1, wherein said α, β-ethylenically unsaturated monomer is hydrophobic.

5. The sheet of claim 4, wherein said monomer is selected from the group consisting of:

(1) acrylates and methacrylates having the structure;

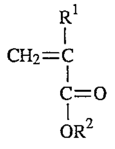

wherein $R^1$ represents hydrogen or $—CH_3$, and $R^2$ represents a member selected from the group consisting of an alkyl group having up to 18 carbon atoms, a cycloaliphatic group having up to 9 carbon atoms, an aryl group having up to 14 carbon atoms, and an oxygen-containing heterocyclic group having up to 10 carbon atoms;

(2) acrylonitrile or methacrylonitrile;

( 3 ) substituted or unsubstituted styrene or α-methylstyrene having the structure:

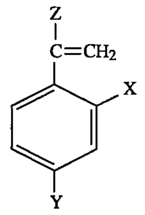

where X and Y independently represent hydrogen, alkyl group having up to 4 carbon atoms, a halogen atom, alkyl halide group, or $OR^m$ where $R^m$ represents hydrogen or an alkyl group having up to 4 carbon atoms, and Z represents hydrogen or methyl; and (4) vinyl acetate.

6. The sheet of claim 1, wherein said α, β-ethylenically unsaturated monomer is hydrophilic.

7. The sheet of claim 6, wherein said hydrophilic monomer is selected from the group consisting of:

(1) Vinyl lactams having the structure:

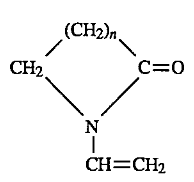

where n represents the integer 2 or 3;

(2) Acrylamide or methacrylamide having the structure:

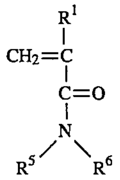

where $R^1$ represents hydrogen or $—CH_3$, $R^5$ represents hydrogen or an alkyl group having up to 10 carbon atoms, and $R^6$ represents a member selected from the group consisting of hydrogen, alkyl groups having up to 10 carbon atoms, and hydroxy-substituted alkyl groups or alkoxy-substituted alkyl groups having the structure of $—(CH_2)_p—OR^7$ where p represents an integer from 1 to 3, inclusive, and $R^7$ represents hydrogen or an alkyl group having up to 10 carbon atoms;

(3) Tertiary amino alkylacrylates or tertiary amino alkylmethacrylates having the structure:

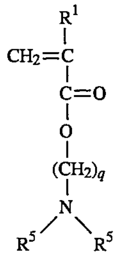

where q represents the integer 1 or 2, and $R^1$ and $R^5$ are as described previously, and each $R^5$ can be the same or different;

(4) Alkoxy alkylacrylates, hydroxy alkylacrylates, alkoxy alkylmethacrylates, or hydroxy alkylmethacrylates having the structure:

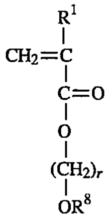

where r represents an integer from 1 to 4, inclusive, $R^1$ is as described previously, and $R^8$ represents hydrogen or an alkyl group having 1 to 4 carbon atoms;

(5) Alkoxy acrylates or alkoxy methacrylates having the structure:

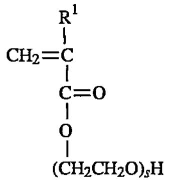

where s represents an integer from 5 to 25, inclusive, and $R^1$ is as described previously.

8. The sheet of claim 1, wherein said polymeric liquid-absorbent component comprises nitrogen-containing polar compounds.

9. The sheet of claim 8, wherein said polymeric liquid-absorbent component comprises polymers formed from monomeric units selected from the group consisting of:

(1) Vinyl lactams having the structure:

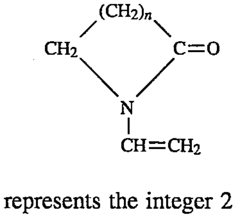

where n represents the integer 2 or 3;

(2) Tertiary amino alkylacrylates or tertiary amino alkylmethacrylates having the structure:

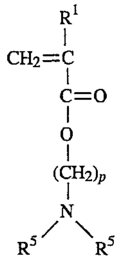

where p represents an integer from 1 to 3, inclusive, $R^1$ represents hydrogen or —$CH_3$, $R^5$ represents hydrogen or an alkyl having up to 10 carbon atoms, and each $R^5$ can be the same or different;

(3) Alkyl quaternary amino alkylacrylates or alkyl quaternary amino alkylmethacrylates.

10. The sheet of claim 1, wherein said polymeric liquid-absorbent component comprises polymers selected from water-absorbent polymers including polyvinyl alcohol, copolymers of vinyl alcohol and vinyl acetate, polyvinyl formal, polyvinyl butyral, gelatin, carboxymethylcellulose, hydroxyethyl cellulose, hydroxypropyl cellulose, hydroxyethyl starch, polyethyl oxazoline, polyethylene oxide, polyethylene glycol, polypropylene oxide.

11. The sheet of claim 9, wherein said polymeric liquid-absorbent component comprises polyvinyl lactam.

12. The sheet of claim 11, wherein said polymeric liquid-absorbent component comprises polyvinyl pyrrolidone.

13. The sheet of claim 9, wherein said polymeric liquid-absorbent component comprises polymers selected from polyvinyl alcohol and polyethylene oxide.

14. The sheet of claim 1, wherein said crosslinking agent is a polyfunctional aziridine.

15. The sheet of claim 14, wherein said polyfunctional aziridine has at least two crosslinking sites.

16. The sheet of claim 15, wherein said aziridine is selected from the group consisting of tris-(β-(N-aziridinyl-)propionate), pentaerythritol-tris-(β-(N-methylaziridinyl propionate)), and trimethylol propane-tris-(β-(N-methylaziridinyl propionate).

17. The sheet of claim 1, wherein said matrix component comprises from about 23.5% to about 98.5% of said composition, said liquid-absorbent component comprises from about 1% to about 70.5% of said composition, and said polyfunctional aziridine comprises from about 0.5% to about 6% of said composition.

18. The sheet of claim 1, wherein said matrix component comprises from about 30% to about 57.5% of said composition, said liquid-absorbent component comprises from about 38.0% to about 69% of said composition, and said polyfunctional aziridine comprises from about 1% to about 4.5% of said composition.

* * * * *